(12) United States Patent
Cazenave

(10) Patent No.: US 11,895,951 B2
(45) Date of Patent: Feb. 13, 2024

(54) FAN HUB COVER

(71) Applicant: DEERE & COMPANY, Moline, IL (US)

(72) Inventor: Blain J. Cazenave, Vacherie, LA (US)

(73) Assignee: DEERE & COMPANY, Moline, IL (US)

(*) Notice: Subject to any disclaimer, the term of this patent is extended or adjusted under 35 U.S.C. 154(b) by 173 days.

(21) Appl. No.: 17/111,615

(22) Filed: Dec. 4, 2020

(65) Prior Publication Data
US 2022/0174878 A1 Jun. 9, 2022

(51) Int. Cl.
A01D 45/10 (2006.01)
A01F 12/44 (2006.01)
F04D 29/70 (2006.01)

(52) U.S. Cl.
CPC .......... *A01F 12/444* (2013.01); *A01D 45/10* (2013.01); *F04D 29/703* (2013.01)

(58) Field of Classification Search
CPC ....... A01F 12/444; A01F 12/48; A01D 45/10; A01D 57/00; F04D 29/703; F04D 29/329; F04D 29/563; F04D 19/002; F04D 27/002
See application file for complete search history.

(56) References Cited

U.S. PATENT DOCUMENTS

| | | | | |
|---|---|---|---|---|
| 2,824,520 A * | 2/1958 | Bartels | ................ | F04D 15/0033 415/131 |
| 4,726,733 A * | 2/1988 | Scampini | ................ | F01D 17/10 415/157 |
| 5,800,120 A * | 9/1998 | Ramsay | ............. | F04D 29/2261 415/129 |
| 8,608,452 B2 * | 12/2013 | Draheim | ............. | F04D 15/0038 415/49 |
| 9,456,547 B2 | 10/2016 | Cazenave et al. | | |
| 11,396,888 B1 * | 7/2022 | Musgrave | ............. | F04D 29/547 |
| 2020/0396295 A1 * | 12/2020 | Martin | ................ | A61B 5/4803 |
| 2022/0018362 A1 * | 1/2022 | Balconi | ................ | F04D 29/041 |

* cited by examiner

*Primary Examiner* — Aaron R Eastman
(74) *Attorney, Agent, or Firm* — Taft Stettinius & Hollister LLP; Stephen F. Rost

(57) ABSTRACT

A fan hub for an extractor for a harvesting machine that harvests a crop. The fan hub having a hub cover positioned along a rotation axis of a fan of the extractor. The hub cover is adjustable to alter the profile of the hub cover relative to the rotation axis.

20 Claims, 9 Drawing Sheets

FAN HUB COVER

FIELD OF THE DISCLOSURE

The present disclosure relates to a hub cover for a fan and more particularly to an adjustable hub cover for an extractor of a harvesting machine.

BACKGROUND

During operation of a sugarcane harvesting machine, sugarcane crop is generally cut near the soil in which it grows. As the crop is harvested, it is cut into smaller pieces referred to as cane billets. The billets can reach a rearward portion of the machine where it travels along a conveyor and is transported to a cart or wagon. Many sugarcane harvesting machines utilize an extractor to extract trash and debris from a cleaning chamber. The extractor is often a fan positioned within ductwork to pull the trash and debris from the cleaning chamber. The fan has sufficient power to draw the trash and debris through the ductwork and fan and expel the trash and debris away from the sugarcane harvesting machine.

In a conventional sugarcane harvesting machine, the fan may have a hub cover extending into an inlet side of the fan. The conventional hub cover is typically a fixed size.

SUMMARY

One embodiment is a fan hub for an extractor for a harvesting machine. The fan hub has a hub cover positioned along a rotation axis of a fan. The hub cover is adjustable to alter the profile of the hub cover relative to the rotation axis.

In one example of this embodiment, the hub cover comprises at least one nested segment that overlaps an adjacent segment of the hub cover to allow the hub cover to expand axially along the rotation axis while substantially shielding an interior region of the fan hub from debris. In one aspect of this example the hub cover has more than one nested segment that at least partially overlaps an adjacent nested segment.

Another example of this embodiment has a core member positioned along the rotation axis and at least partially within the hub cover, the core member configured to extend axially away from the hub cover along the fan axis relative to the fan. In one aspect of this example both the hub cover and the core member are selectively expandable along the rotation axis. In yet another aspect of this example the core member comprises at least one nested segment that at least partially overlaps an adjacent segment.

Yet another example of this embodiment has an actuator that selectively alters the size of the hub cover. One aspect of this example includes a user interface wherein the actuator is selectively adjustable through the user-interface. Another aspect of this example has a controller that selectively alters the size of the hub cover with the actuator based on operating conditions. In one part of this aspect the operating conditions are input by a user. Another part of this aspect has at least one vehicle sensor in communication with the controller, wherein the operating conditions are readings from the at least one vehicle sensor.

Yet another aspect of this example has a core member and the actuator selectively alters the size of the fan hub by altering the position of one or more of the fan hub and the core member. Part of this aspect has a second actuator wherein one of the actuator or the second actuator selectively alters the size of the fan hub and the other of the actuator or second actuator selectively alters the size of the core member.

In yet another example, the hub cover comprises one or more baffles that permit axial expansion of the hub cover while substantially sealing an interior region thereof. In yet another example, the hub cover rotates with the fan.

Another embodiment of this disclosure is a harvesting machine that has a ground engaging mechanism configured to selectively move the harvesting machine along an underlying surface, a prime mover configured to selectively power the ground engaging mechanism, a harvesting head configured to harvest a crop from the underlying surface, a processing assembly configured to separate debris from the crop, and an extractor assembly in the processing assembly. The extractor assembly has a fan for separating debris from the crop, the fan having an inlet side and an exhaust side and selectively powered by a motor to rotate about a rotation axis and a hub cover positioned along the rotation axis and extending at least partially into the inlet side of the fan. The hub cover is adjustable to alter a volume of displacement along the inlet side to agitate crop and debris presented to the inlet side of the fan.

In one example of this embodiment, the hub cover has at least one nested segment that overlaps an adjacent segment to permit axial expansion of the hub cover along the rotation axis while substantially isolating an interior region of the hub cover from debris. Another example has a core member positioned along the rotation axis, wherein both the core member and the hub cover are axially extendable along the rotation axis. In part of this example, the core member is axially extendable along the rotation axis independently from the hub cover.

Yet another embodiment is a method for improving crop capture in a harvesting machine. The method includes providing a harvesting head, a processing assembly with an extractor assembly, the extractor assembly comprising a fan, the fan having an inlet side and being selectively powered by a motor to rotate about a rotation axis and a hub cover positioned along the rotation axis and extending at least partially into the inlet side of the fan, the hub cover configured to be variably sized to accommodate different crop condition and adjusting or replacing the hub cover to alter a volume of displacement along the inlet side to agitate crop and debris presented to the inlet side of the fan. The adjusting the hub is configured to be performed one or more of manually, through user inputs on a user interface, or automatically by a controller responsive to inputs from sensors on the harvesting machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
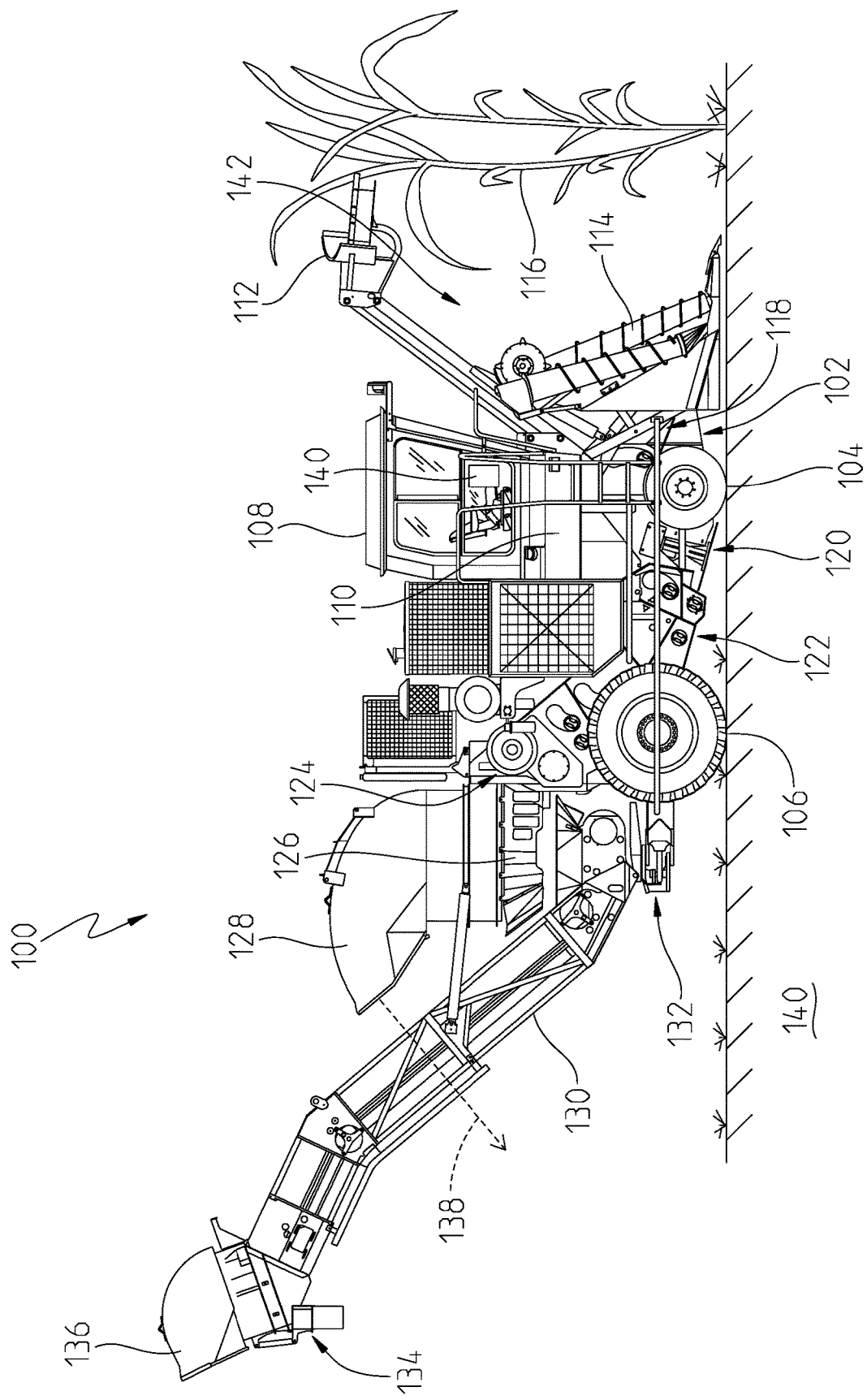
FIG. 1 is a side view of a sugarcane harvesting machine.

Turning now to FIG. 1 of this disclosure, an embodiment of a sugarcane harvesting machine 100 is shown. The harvester or machine 100 is presented in a side view in FIG. 1, with the front of the machine 100 facing to the right. Accordingly, certain left-side components of the machine 100 may not be visible in FIG. 1.

The machine 100 may include a main frame 102 supported on ground engaging mechanisms such as track assemblies or wheels (i.e., a front wheel 104 and a rear wheel 106), with a cab 108 adapted to house an operator. The cab 108 may include a plurality of controls for controlling the operation of the machine 100, including, but not limited to, a user interface 140. A prime mover such as an engine 110 or other power system may supply power for driving the machine 100 along a field and for powering various driven components of the machine. In certain embodiments, the engine 110 may directly power a hydraulic pump, a pneumatic pump, an electric generator and other devices and various driven components of the harvester may be powered by hydraulic, pneumatic, or electric motors receiving power from the hydraulic pump, pneumatic pump, or stored electrical energy from the generator.

The machine may have a harvesting head 142 with a cane topper 112 that may extend forward of the frame 102 in order to remove the leafy tops of sugarcane plants 116, and a set of crop dividers 114 (only the right-side divider shown in FIG. 1) may then guide the remainder of the sugarcane toward internal mechanisms of the machine 100 for processing. As the sugarcane harvesting machine 100 moves across a field, plants 116 passing between the crop dividers 114 may be deflected downward by one or more knockdown rollers 118 before being cut near the base of the plants by a base cutter assembly 120 mounted on the main frame 102. Rotating disks, guides, or paddles on the base cutter assembly 120 may further direct the cut ends of the plants upwardly and rearward within the harvester 100 toward a feeding mechanism 125 such as successive pairs of upper and lower feed rollers. The feeding mechanism may be rotatably supported by a chassis 122, and may be rotatably driven by a hydraulic or electric motor or other device in order to convey the stalks toward a chopper drum module 124 for chopping into relatively uniform billets.

The chopper drum module 124 may include upper and lower chopper drums which may rotate in opposite directions around, respectively, parallel axes in order to chop the passing stalks into billets and propel the billets into a cleaning chamber 126 at the base of a first or primary extractor 128. The first extractor 128 may utilize a powered fan to extract trash and debris from the cleaning chamber 126.

As also shown in FIG. 1, a loading conveyor or elevator system 130 may be provided at a rear portion of the harvester. The loading conveyor or elevator system 130 may include a forward end located at the bottom of the cleaning chamber 126, and the system may then convey the cleaned billets upward to a discharge location 134 near or below a second extractor 136. The billets may be discharged via the second extractor 136 into a trailing truck, cart, wagon or other receptacle.

The elevator or conveyor system 130 may be coupled to a swing table or pivot bearing 132, as shown in FIG. 1. As such, the entire system 130 is capable of pivoting up to or about 180° to unload the billets from either side of the machine 100.

In one aspect of this disclosure, the first extractor 128 may be located adjacent a basket and have a duct positioned partially there around. During operation, the sugarcane billets may pass through the basket and be received at a first end of a conveyor. The first extractor 128 may include a fan assembly or other similar apparatus for drawing debris (i.e., leaves) and other impurities from the sugarcane billets that are received by the inclined conveyor. The duct may be coupled to the primary extractor 128 to generate a flow path for the air and debris as it is drawn through the extractor 128 by the fan assembly.

Figure 2:
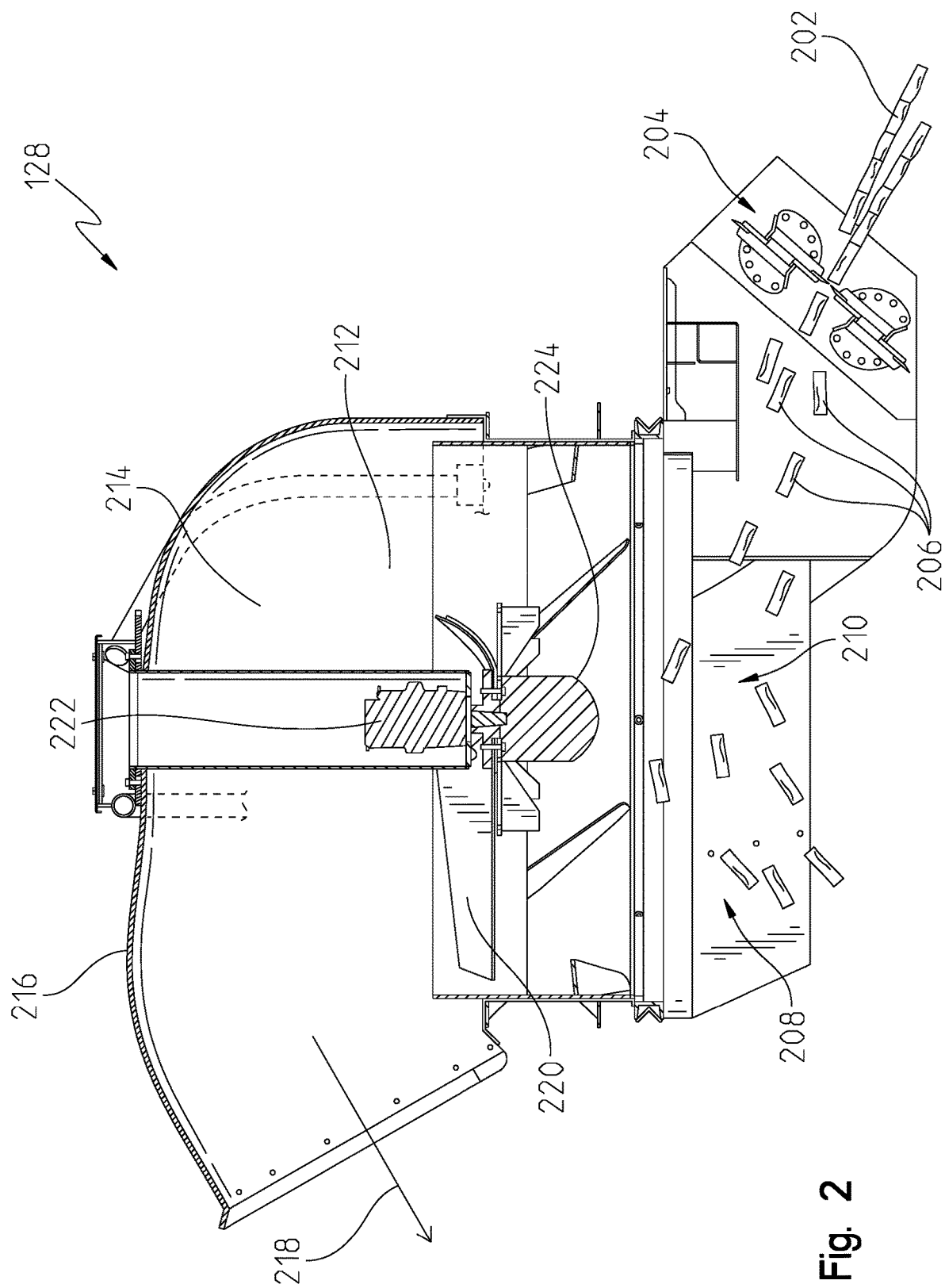
FIG. 2 is a section side view of one embodiment of an extractor.

Referring now to FIG. 2, a cross-sectional view of one example of the first extractor 128 is illustrated. In the example of FIG. 2, cane 202 or other similar crop may be directed into a chopper drum module 204 where it is chopped into billets 206 as it is fed into a cleaning chamber 208. The cleaning chamber may be an area along an inlet side 210 of a fan assembly 212. The fan assembly 212 may draw air and other debris from the inlet side to an exhaust side 214 where the debris is ultimately directed by a hood 216 out of the primary extractor in an exhaust direction 218. The fan assembly 212 may include a fan 220 coupled to a motor 222 to selectively rotate and draw air and debris from the inlet side to the exhaust side 214 and ultimately out of the primary extractor 128 in the exhaust direction 218.

The primary extractor 128 may utilize the fan assembly 212 to separate the billets 206 from any other debris that may have entered the cleaning chamber 208. Ideally, primary extractor 128 will utilize the fan assembly 212 to separate all debris from the billets 206 without exhausting any of the billets 206 from the primary extractor 128. Rather, the billets 206 should remain on the inlet side 210 and fall to the elevator system 130 to be further processed as discussed herein.

In one example, the fan assembly 212 may have a fan hub cover 224 coupled to a fan hub of the fan 220 to rotate therewith on the inlet side 210 of the fan 220. In this configuration, the hub cover 224 may extend into the cleaning chamber 208 on the inlet side 210. As the billets 206 and debris enter the cleaning chamber 208, the hub cover 224 may at least partially contact some of the billets 206 and debris. This contact may lead to further agitating the mixture of debris/billets entering the cleaning chamber to increase the efficiency of the primary extractor 128 in removing the debris. The "efficiency" of the primary extractor 128 may be referring to the separation and extraction of debris along the exhaust path 218 without exhausting billets 206. In other words, the primary extractor 128 must be generating a strong enough air flow with the fan assembly 212 to ensure most of the debris is removed from the cleaning chamber 208 but not so strong that billets 206 that should be directed to the elevator system 130 are being exhausted from the primary extractor 128 along the exhaust direction 218.

In one aspect of this disclosure, the hub cover 224 may be positioned in the path of the incoming billets 206 and debris to reduce the momentum of the incoming billets 206 into the cleaning chamber 208. This initial throwing of the billets 206 into the cleaning chamber 208 from the chopper drum module 204 makes the billets 206 more susceptible to being extracted from the cleaning chamber 208 and distributed in the exhaust direction 218 onto the ground. However, in the embodiments discussed herein the spinning hub cover reduces this risk by contacting the billets 206 and reducing the initial momentum of at least some of the billets 206 as they enter the cleaning chamber 208.

In one example, sugarcane billet and leaf separation is promoted when the billet/leaf unit is contacted by any external forces during its trajectory through the cleaning chamber 208. During the chopping process of the sugarcane stalk, the chopper drum module 204 may not always entirely separate all leafy matter adequately from the corresponding billets 206 to allow for the extractor forces of a conventional extractor to separate and exhaust the extraneous leaf matter from the billet 206 in the cleaning chamber 208. Accordingly, residual leaf matter may exist on the billet due to the inefficiency of this process with a conventional harvesting machine. However, the embodiments discussed herein present a spinning hub cover 224 that promotes further leaf billet separation by agitating partially severed leaf and sticking leaf matter from the billet 206 allowing for more leaf matter extraction from the cleaning chamber 206. This agitation is further generated as the spinning hub cover 224 promotes further billet to billet interaction and billet and cleaning chamber interaction which also promotes billet leaf separation. Accordingly, the embodiments provided herein provide an adjustable hub cover for maximizing agitation for given crop feed rates among other things.

The hub cover of this disclosure may be adjustable to accommodate different harvesting conditions. The term "adjustable" or "adjusting" may refer to altering the size and shape of a resizable hub cover. Alternatively, the term "adjustable" or "adjusting" may refer to removably coupling differently sized hub covers to the extractor 128. Accordingly, the extractor 128 contemplated herein may have an adjustable hub cover utilizing any one or more of the embodiments considered herein.

Figure 3:
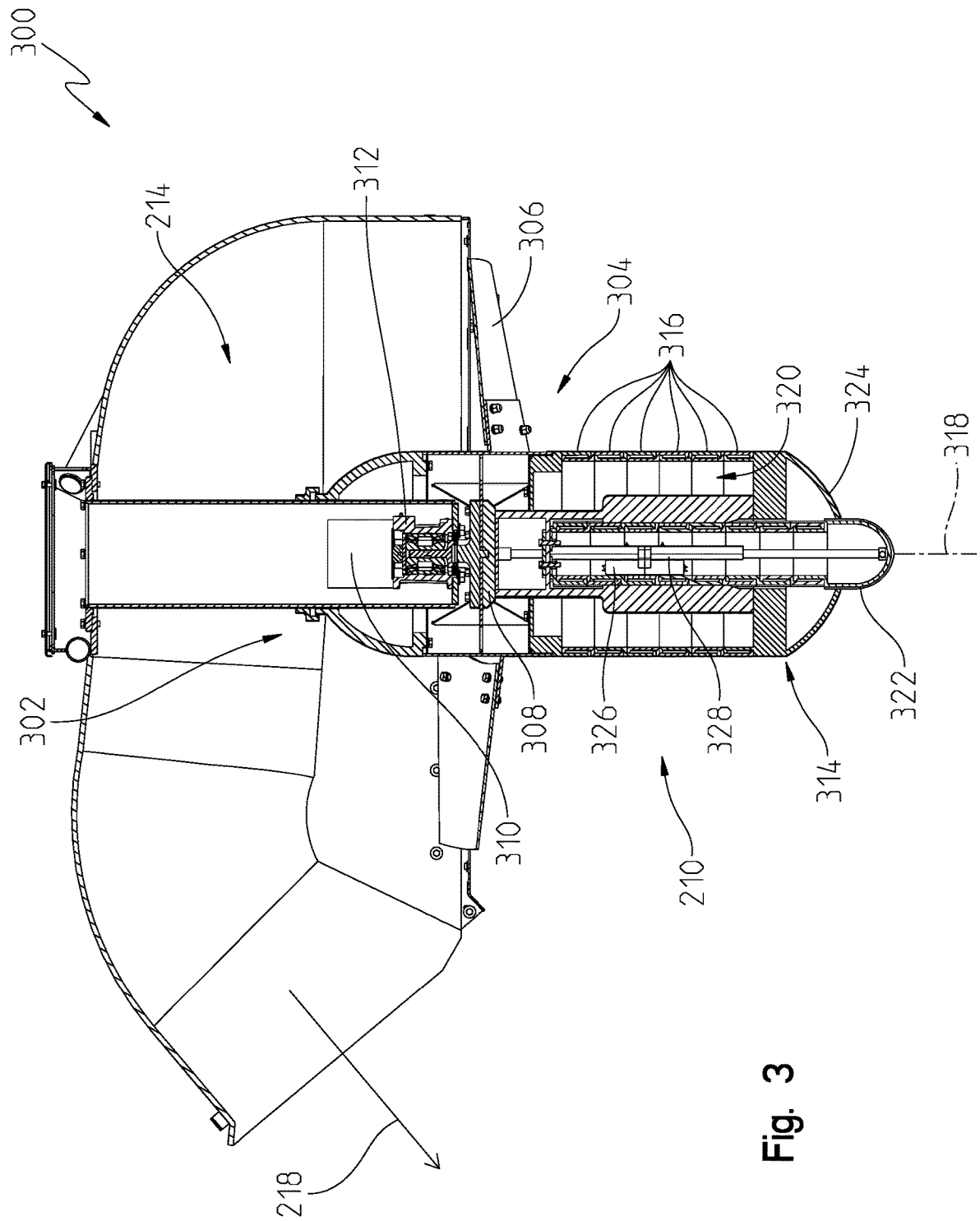
FIG. 3 is a section side view of another embodiment of an extractor.

Referring now to FIG. 3, a partial section view of another embodiment of an extractor 300 with a hub cover assembly 350 is illustrated. The extractor 300 may have a fan assembly 302 having a fan 304 having blades 306 extending from a fan hub 308. The fan 304 may be selectively powered by a motor 310 through a bearing assembly 312. The embodiment of FIG. 3 may be substantially similar to that of FIG. 2 except a hub cover 314 coupled to the fan hub 308 is configured to be resizable. More specifically, the hub cover 314 may have a plurality of nested segments 316 partially overlapping one another to provide a hub cover 314 that is axially extendable along a rotation axis 318 of the fan assembly 302. Further, the overlapping relationship of each nested segment 316 of the hub cover 314 may allow for the hub cover 314 to be extendable along the rotation axis 318 while substantially shielding a fan hub interior region 320 from debris. That is to say, regardless of the extension of the fan hub 314, the fan hub interior region 320 may remain shielded from debris and the like.

In the embodiment of FIG. 3, a core member 322 may be positioned through a central portion of the hub cover 314 along the rotation axis 318. The core member 322 may have a smaller diameter than the hub cover 314 and be at least partially positioned in the interior region 320. The hub cover 314 may be axially extendable along the rotation axis 318 outside of a cone segment 324 of the hub cover 314. The core member 322 may be formed of partially overlapping nested segments 316 similar to those of the hub cover 314 albeit differently sized. The nested segments 316 may be sized to allow adjacent sections to overlap one another to allow the core member 322 to extend and retract along the rotation axis 318. Accordingly, both the hub cover 314 and the core member 322 may be repositionable along the rotation axis 318.

In one non-exclusive example, one or both of the hub cover 314 and core member 322 may be selectively extendable along the rotation axis 318 via one or more actuator 326, 328. More specifically, a hub cover actuator 326 may be selectively engaged to extend the corresponding hub cover 314 while a core member actuator 328 may be selectively engaged to extend the corresponding core member 322. In one example of this disclosure, the core member 322 and corresponding actuator 328 may be coupled to the hub cover 314 in such a configuration that the orientation of the core member 322 relative to the cone segment 324 does not substantially change when the hub cover 314 is axially extended or contracted along the rotation axis 318. Rather, the core member 322 is coupled to the cone segment 324 so that movement of the cone segment 324 also moves the core member 322 and the core member actuator 328 therewith.

In one aspect of this disclosure, the actuators 326, 328 may be electrically powered linear actuators. Further, the fan 304 may be coupled to the bearing assembly 312 and motor 310 through one or more hollow shafts. Further, an electrical rotary coupler may be positioned along the shaft to allow the shaft and actuators 326, 328 to rotate with the fan 304 while a portion of the electrical rotary connectors remains stationary. This allows control signals from other areas of the machine 100 to be communicated to the actuators 326, 328 to reposition one or more of the hub cover 314 and the core member 322.

Figure 4:
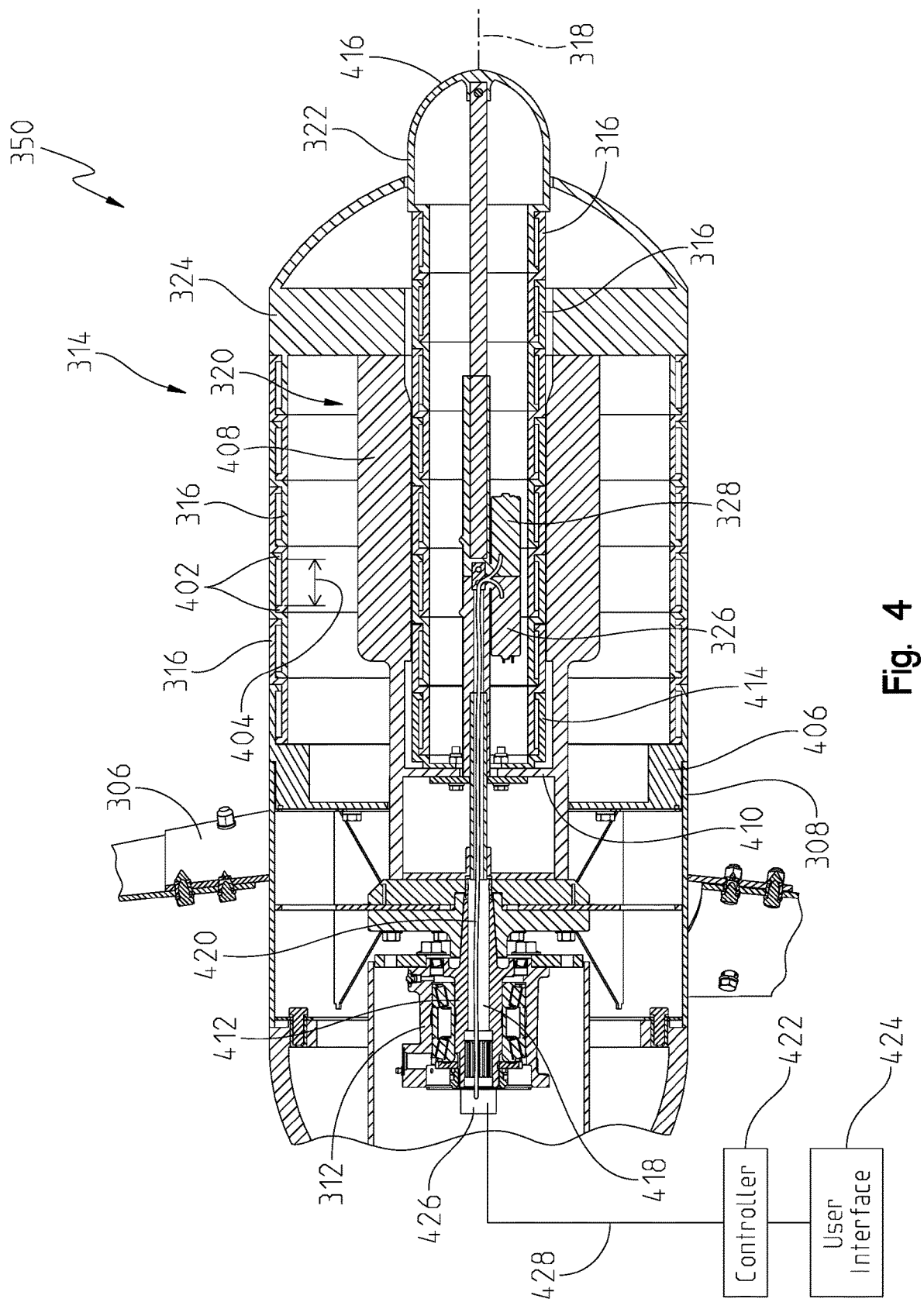
FIG. 4 is a section side view of a hub cover assembly.

Referring now to FIG. 4, a detailed section view of the hub cover assembly 350 is illustrated. More specifically, the nested relationship of the hub cover 314 and core member 322 are illustrated in FIG. 4 with the hub cover assembly 350 in the fully retracted configuration. In this configuration, each of the nested segments 316 may be axially position in a retracted configuration relative to the adjacent nested segment 316. In one example of this disclosure, each nested segment 316 may have an S-like section wherein a portion of the nested segment 316 is radially inside of the adjacent nested section 316 and a portion of the nested segment 316 is radially outside of another adjacent nested section 316.

The nested segments 316 may have catches or stops 402 that interact with the adjacent nested section 316 to provide a travel distance 404 that a nested segment 316 is permitted to travel relative to an adjacent nested segment 316 before the stops 402 limit further movement. In this configuration, the nested segments 316 substantially prevent debris or the like from entering the fan hub interior region 320 by substantially shielding the interior region 320 from the surrounding environment regardless of the extended configuration of the hub cover assembly 350. The travel distance 404 will depend on the geometry of the hub cover assembly 350 and the tonnage of the crop being harvested. Accordingly, the travel distance 404 of FIG. 4 is only one example, and other travel distances 404 may be appropriate for other embodiments of this disclosure.

In the embodiment of FIG. 4, a base hub member 406 may be positioned adjacent to the fan hub 308. Further, the base hub member 406 may be coupled to the fan hub 308 to rotate therewith about the rotation axis 318. The base hub member 406 may act as a starting section to allow a subsequent nested section 316 to be coupled thereto and axially aligned with the rotation axis 318. Any number of nested segments 316 may be positioned between the base hub member 406 and the cone segment 324 of the hub cover 314 to allow the hub cover 314 to be axially extended along the rotation axis 318 and different sized extractors may have a different number of nested segments 316.

The core segment 324 may have a core support 408 extending back towards the fan hub 308 from axially distal portion of the hub assembly 350 relative to the fan hub 308. The core support 408 may extend through the interior region 320 towards the fan hub 308 and have a cavity therein sized to receive the core member 322. In one aspect of this disclosure, the core support 408 is coupled to the cone segment 324 such that as the cone segment 324 is extended axially along the rotation axis 318, the core support 408 is extended away from the fan hub 308. Further still, in one aspect of this disclosure the core support 408 has an actuator coupling flange 410 defined therein to allow the hub cover actuator 326 to be coupled to the core support 408. In one aspect of this disclosure, a base portion of the hub cover actuator 326 is coupled to the actuator flange 410 and a rod portion of the actuator 326 is coupled to a portion of a shaft 412 of the bearing assembly 312. In this configuration, linear displacement of the hub cover actuator 326 along the rotation axis 318 causes the cone segment 324 to be extended from the fan hub 308 as the nested segments 316 slide relative to one another to accommodate the extension.

The core member 322 may be substantially positioned within the cavity of the core support 408 to move therewith as the hub cover 314 moves along the rotation axis 318. In the embodiment of FIG. 4, a base section 414 of the core member 322 may be coupled to the flange 410. In this configuration, when the actuator 326 extends to move the cone segment 324 away from the fan hub 308, the base section 414 of the core member 322 may move away from the fan hub 308 as well. Accordingly, the extension of the core member 322 away from the cone segment 324 may not substantially change as the actuator 326 is engaged.

In the embodiment illustrated in FIG. 4, the core member actuator 328 may have a base end coupled to the base end of the hub cover actuator 326. A rod end of the actuator 328 may be coupled to a nose piece 416 of the core member 322. The rod end of the actuator 328 is extendable relative to the base end to extend the core member 322 as the nested segments 316 of the core member 322 slide relative to one another. Extension of the actuator 328 may extend the nose piece 416 axially away from the cone segment 324 regardless of the extension of the hub cover actuator 326. In other words, since the core member actuator 328 is ultimately coupled to the flange 410 of the core support 408, which is fixedly coupled to the cone segment 324, extension of the core member actuator 328 extends the nose piece 416 away from the cone segment 324 regardless of the extension configuration of the hub cover actuator 326.

Accordingly, the hub cover 314 of FIG. 4 may be manipulated with the hub cover actuator 326 to alter the length of the hub cover 314 relative to the fan hub 308 and the core member 322 may be manipulated with the core member actuator 328 to alter the length of the core member 322 relative to the cone segment 324. In this configuration, the hub cover 314 may have a greater diameter than the core member 322. As such, extending the hub cover 314 may provide a substantial increase in the volume displaced by the hub assembly 350. However, extending the core member 322 may provide a comparatively smaller increase in volume of the hub assembly 350. As discussed in more detail herein, the ability to alter the volume of space occupied by the hub assembly 350 may provide for a more efficient removal of debris under different crop conditions. More specifically, the preferred volume of space occupied by hub cover 314 may be determined by the various crop conditions. The ability to alter the volume of the hub cover 314 to accommodate different crop conditions will allow for more efficient cleaning with less billet losses.

In one aspect of this disclosure, the shaft 412 may have a bore 418 there through along the rotation axis 318 that allows wiring 420 or the like for the actuators 326, 328 to be coupled to a controller 422. The controller 422 may selectively control the linear actuators 326, 328 to become oriented in a plurality of configurations as discussed herein. In one aspect of this disclosure, a user interface 424 may be in communication with the controller 422 to allow a user to selectively reposition the actuators 326, 328 via the user interface 424. The wiring 420 may pass through a junction 426 that allows the wiring of the actuators 326, 328 to rotate with the fan assembly 302 while wires 428 running to the controller 428 do not rotate. This junction 426 may be a rotary electrical coupler such as a wire slip ring or any other known electrical coupler.

Figure 5A:
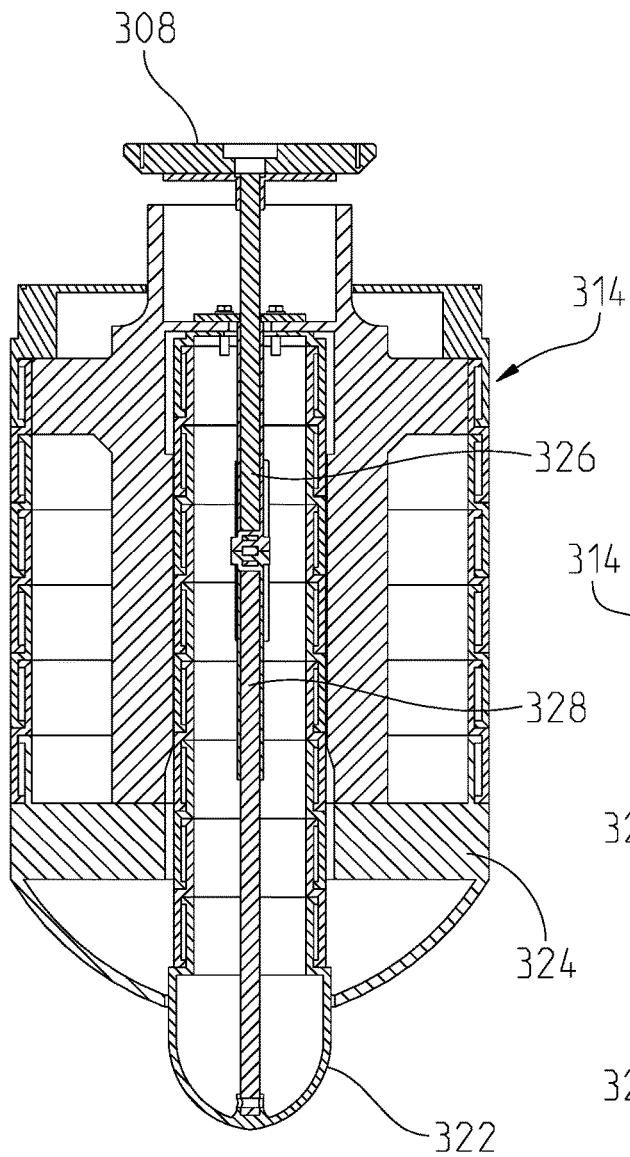
FIGS. 5a-5d are section side views of the hub cover assembly of FIG. 4 in different configurations.

Referring now to FIGS. 5a-5d, the hub cover assembly 350 is illustrated in different configurations. In FIG. 5a, the hub cover assembly 350 is in a substantially retracted configuration wherein both the hub cover 314 and core member 322 are in a fully retracted configuration. The fully retracted configuration may be when all nested segments 316 of both the hub cover 314 and the core member 322 are moved as close to the hub 308 as possible. Further, in the fully retracted configuration of FIG. 5a, the hub cover assembly 350 may occupy the least possible volume of space relative to the other configurations of FIGS. 5b-5d. As will be discussed in more detail herein, this configuration may be ideal when crop is being processed at a fast rate.

Figure 5B:
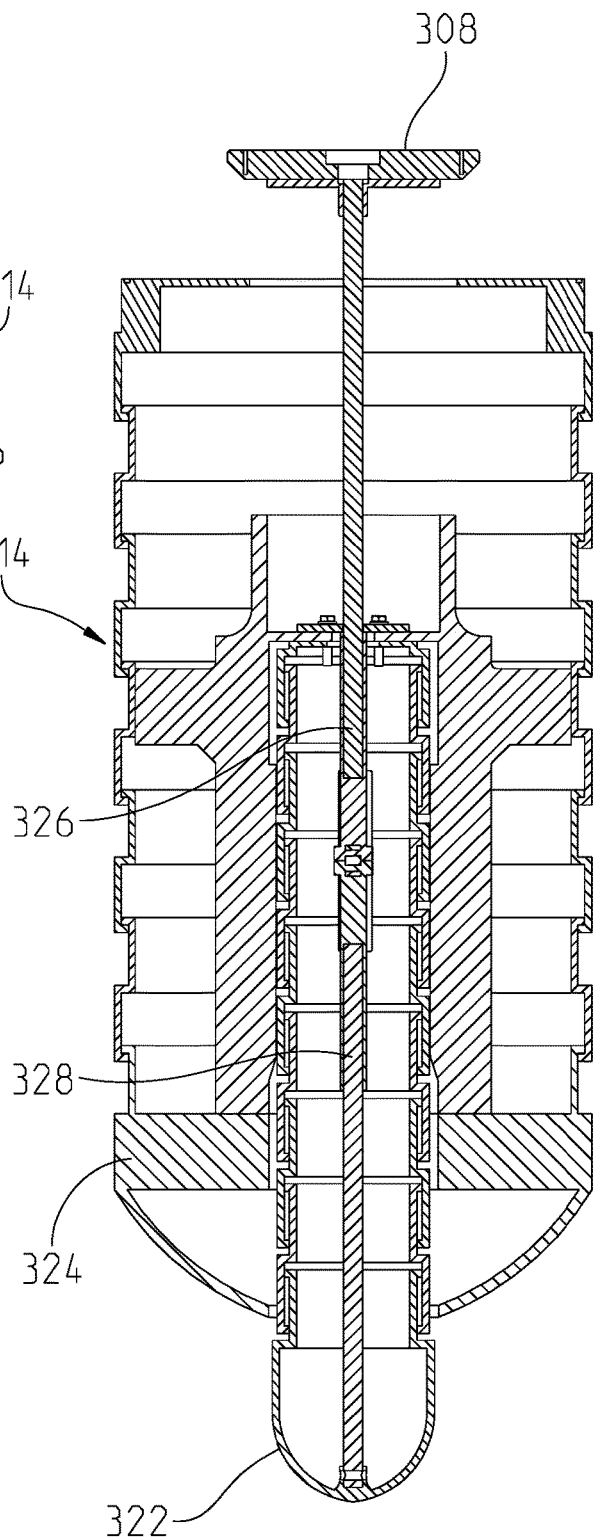

In FIG. 5b the hub cover actuator 326 may be in the fully extended position wherein the hub cover 314 in the axially longest available orientation. In this configuration, the nested segments 316 of the hub cover 314 have transitioned from the retracted orientation of FIG. 5a to the extended configuration of FIG. 5b. As the actuator 326 extends the hub cover 314 to the extended position, the nested segments 316 of the hub cover 234 slide relative to one another until the corresponding stops 402 prevent further axial movement. Once the stops 402 of each adjacent nested segment 316 are contacting one another, the hub cover 314 may be in the fully extended configuration. It is noteworthy in FIG. 5b that the core member 322 has moved axially away from the hub 308 but not substantially moved relative to the cone segment 324.

Figures 5C, 5D:
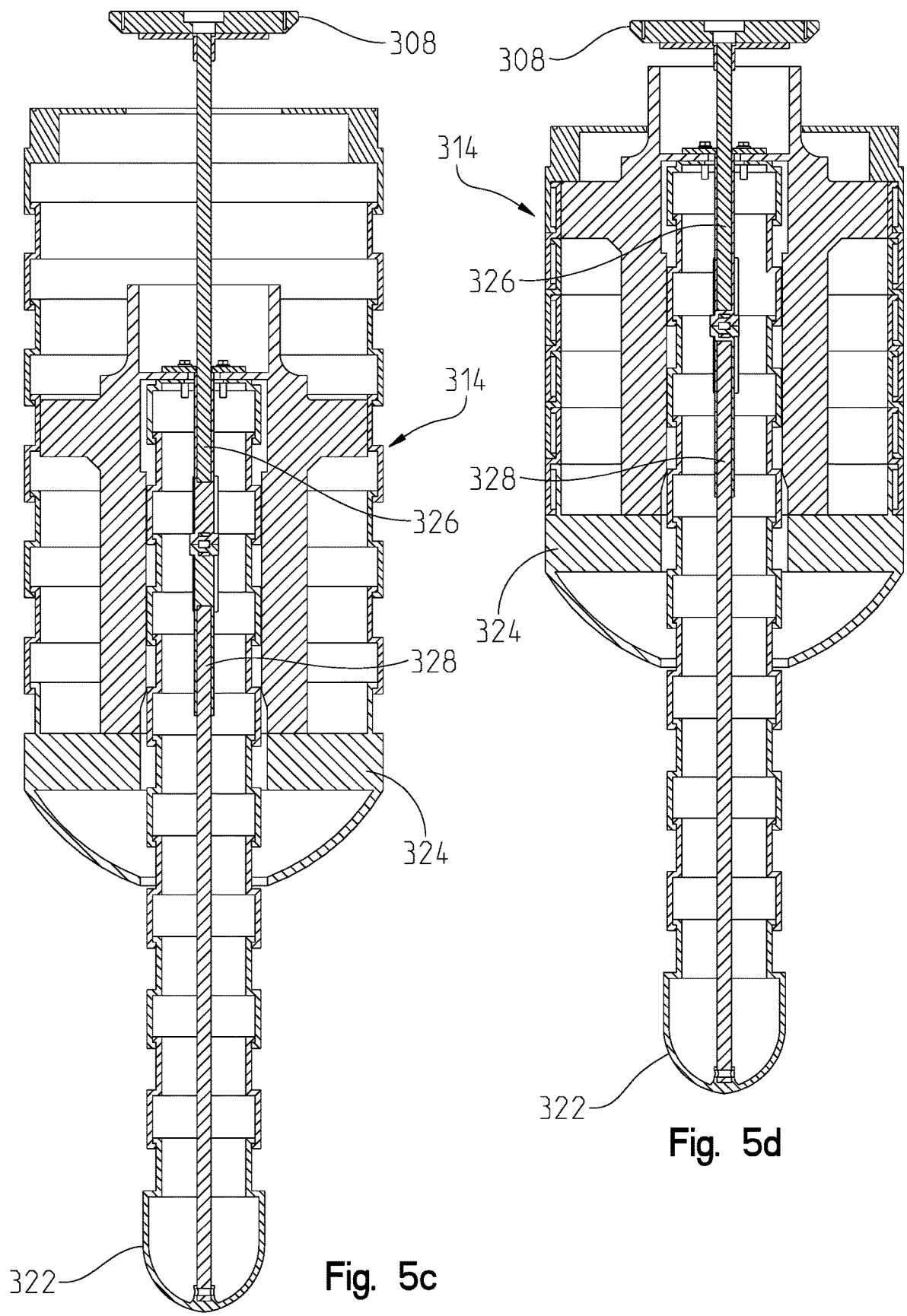

In FIG. 5c, both the hub cover actuator 326 and the core member actuator 328 may be in the fully extended configuration. In this orientation, the hub cover 314 may remain in substantially the same configuration as illustrated in FIG. 5b while the core member actuator 328 was transitioned to the extended configuration. This axially extends the core member 322 relative to the cone segment 324. In the configuration of FIG. 5c, the hub cover assembly 350 may occupy the greatest possible volume of space. In yet another configuration, the hub cover actuator 326 may remain in the retracted configuration while the core member 322 is fully extended as illustrated in FIG. 5d.

In one aspect of this disclosure, the number of nested segments 316, height of retracted (FIG. 5a) and extended hub cover (FIG. 5b), and available volume of the hub cover 314 will be selected based on tonnage of crop being processed by the machine 100. For example, if a machine 100 is likely to have a harvest rate for a high tonnage of crop, the hub cover 314 may be configured to occupy less volume. However, a machine that is intended to process crop at a comparatively smaller rate may have a hub cover 314 capable of occupying more volume. In one aspect of this disclosure, the available geometry of the hub cover 314 may be determined based on the expected density of the particles entering the cleaning chamber 208.

While specific configurations are discussed herein, this disclosure contemplates selectively repositioning the hub cover 314 and core member 322 to any position between the specific configurations discussed herein. That is to say, while combinations of fully extended and retracted configuration of the hub cover actuator 326 and the core member actuator 328 are discussed herein, the actuators 326, 328 may also become oriented in any length between the fully retracted and fully extended configurations. Further, in one aspect of this disclosure the controller 422 may selectively alter each of the hub cover actuator 326 and the core member actuator 328 to reposition the corresponding hub cover 314 and core member 322 in an ideal configuration determined by the controller 422. Alternatively, a user may manipulate the orientation of the actuators 326, 328 through the user interface 424 to a user-desired orientation.

Figure 6:
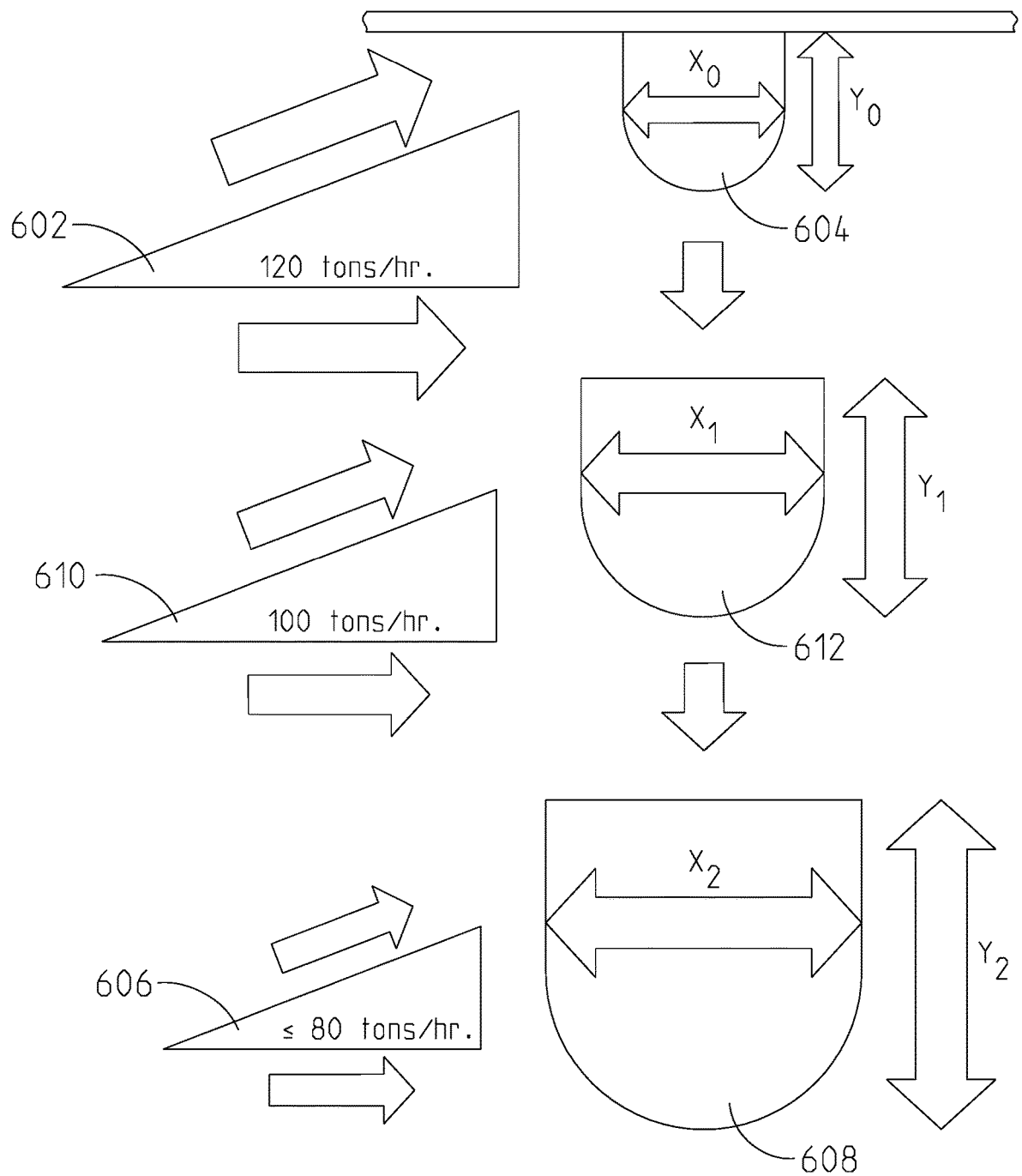
FIG. 6 is a graphical representation of a logic protocol for the present disclosure.

Referring now to FIG. 6, one of the advantages of the present disclosure will become more apparent. Generally speaking, the volume of space occupied by the adjustable hub cover 350 affects the efficiency with which the extractor 300 separates debris from the billets 206. For example, if the extractor 300 is processing about 120 tons of sugarcane or the like per hour 602 or more, the adjustable hub cover 350 may be in the fully retracted configuration 604 such as the one illustrated in FIG. 5a. In this configuration, the high processing rate of the crop may provide adequate agitation as the crop is presented to the cleaning chamber 208. The agitation of the billets 206 with other debris in the cleaning chamber 208 due to the large amount of crop being processed means that the adjustable hub cover 350 does not need to substantially agitate the crop in the cleaning chamber 208 and can be configured in the fully retracted configuration 604.

Alternatively, if the extractor 300 is processing at or less than about eighty tons of crop per hour 606, the adjustable hub cover 350 may be in a fully extended configuration 608 similar to FIG. 5c. In the fully extended configuration 608, the adjustable hub cover 350 may extend relatively farther into the cleaning chamber 208 compared to the fully retracted configuration 604. Accordingly, the fully extended configuration 608 provides additional agitation to crop and debris presented into the cleaning chamber 208 to thereby increase the efficiency of the extractor 300. More specifically, the lower crop feeding rate 606 may not provide enough crop material to become ideally agitated against other crop material in the cleaning chamber 208. By increasing the volume of the adjustable hub cover 350 to the fully extended configuration 608, the adjustable hub cover 350 extends further into the cleaning chamber 208 to provide additional agitation of the crop material presented therein to increase the efficiency with which debris is removed by the extractor 300.

The adjustable hub cover 350 may also be adjusted to an intermediate configuration 612 wherein crop flow rates 610 are between the high 602 and low 606 flow rates discussed herein. In the intermediate configuration, the adjustable hub cover 350 may be partially expanded to provide some additional agitation of the crop in the cleaning chamber 208 without substantially clogging or otherwise inhibiting the efficiency of the cleaning chamber 208. The intermediate configuration 612 may be the configuration illustrated in FIG. 5b or FIG. 5d. Alternatively, the intermediate configuration 612 may be any configuration of the adjustable hub cover between the retracted configuration of FIG. 5a and the extended configuration of FIG. 5c.

In one aspect of this disclosure, the more particles in the cleaning chamber 208, the less external agitation that is needed from the hub cover 314. In other words, the adjustability of the hub cover 314 disclosed herein allows the machine 100 to process crop at different rates without substantially sacrificing efficiency. Accordingly, in one aspect of this disclosure the user can adjust the volume of the hub cover 314 as determined by harvesting practices, mill reports, field losses, or the like.

In one aspect of this disclosure, the adjustable hub cover 350 is reconfigurable based on expected or measured crop flow rates to optimize debris separation efficiency in the cleaning chamber 208. As explained herein, one method of optimizing the extractor 300 is by increasing the size of the adjustable hub cover 350 when lower crop rates are being processed there through. In one embodiment of this disclosure, the adjustable hub cover 350 may be automatically controlled via the controller 422 to adjust the configuration of the adjustable hub cover 350. More specifically, the flow rate of crop through the machine 100 may be measured through one or more sensor in communication with the controller 422. The controller 422 may then reference a lookup table or the like to alter the configuration of the adjustable hub cover 350 based on the measured flow rate of the crop.

Alternatively, the user interface 424 may be used to selectively alter the configuration of the adjustable hub cover 350. The user interface 424 may have user selectable inputs to allow the user to select which configuration of the adjustable hub cover 350 is desired. In one aspect of this embodiment, the user may know the likely crop flow rate of the field being harvested. With an estimate of the crop flow rate, the user may engage inputs of the user interface 424 to identify to the controller 422 the desired configuration of the adjustable hub cover 350. The controller 422 may then adjust one or more of the actuators 326, 328 to alter the configuration of the adjustable hub cover.

Figure 7:
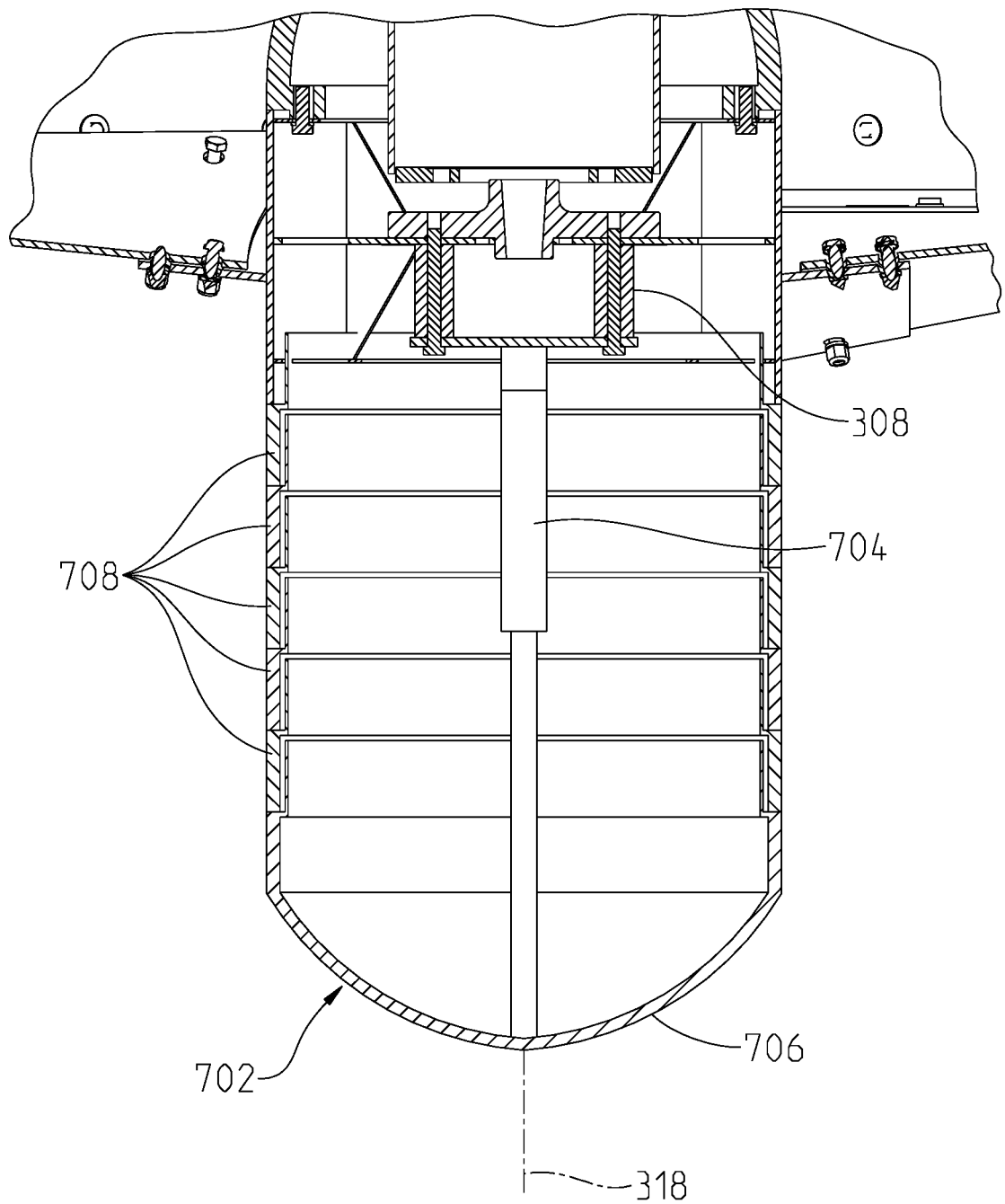
FIG. 7 is another embodiment of a hub cover assembly.

In yet another embodiment of this disclosure illustrated in FIG. 7 is an adjustable hub cover 702 that does not contain a core member 422. In this embodiment an actuator 704 may be coupled between the fan hub 308 and a nose piece 706 of the hub cover 702. In this embodiment, the hub cover 702 may have nested segments 708 that are able to slide relative to one another similar to the nested segments 316 discussed herein.

Alternatively, one contemplated embodiment of FIG. 7 does not have an actuator 704 at all. Rather, each nested segment 708 may be selectively coupled to one another by a user to define the size of the hub cover 702. In this configuration, the user would identify the desired hub cover size and manually reconfigure the hub cover 702 by selecting the desired number of segments 708 to be positioned between the fan hub 308 and the nose piece 706. In this embodiment, the segments 708 would not substantially slide relative to one another but rather would be coupled to one another in such a way that the adjacent segments 708 are axially fixed relative to one another along the rotation axis 318. The user may alter the size of the hub cover 702 by selectively removing or adding segments 708 to alter the size of the hub cover 702. Alternatively, in one embodiment considered herein the user may have several differently sized hub covers that can be manually coupled to the fan hub 308 and select which of the hub covers is preferred for the expected crop flow rate.

Figure 8:
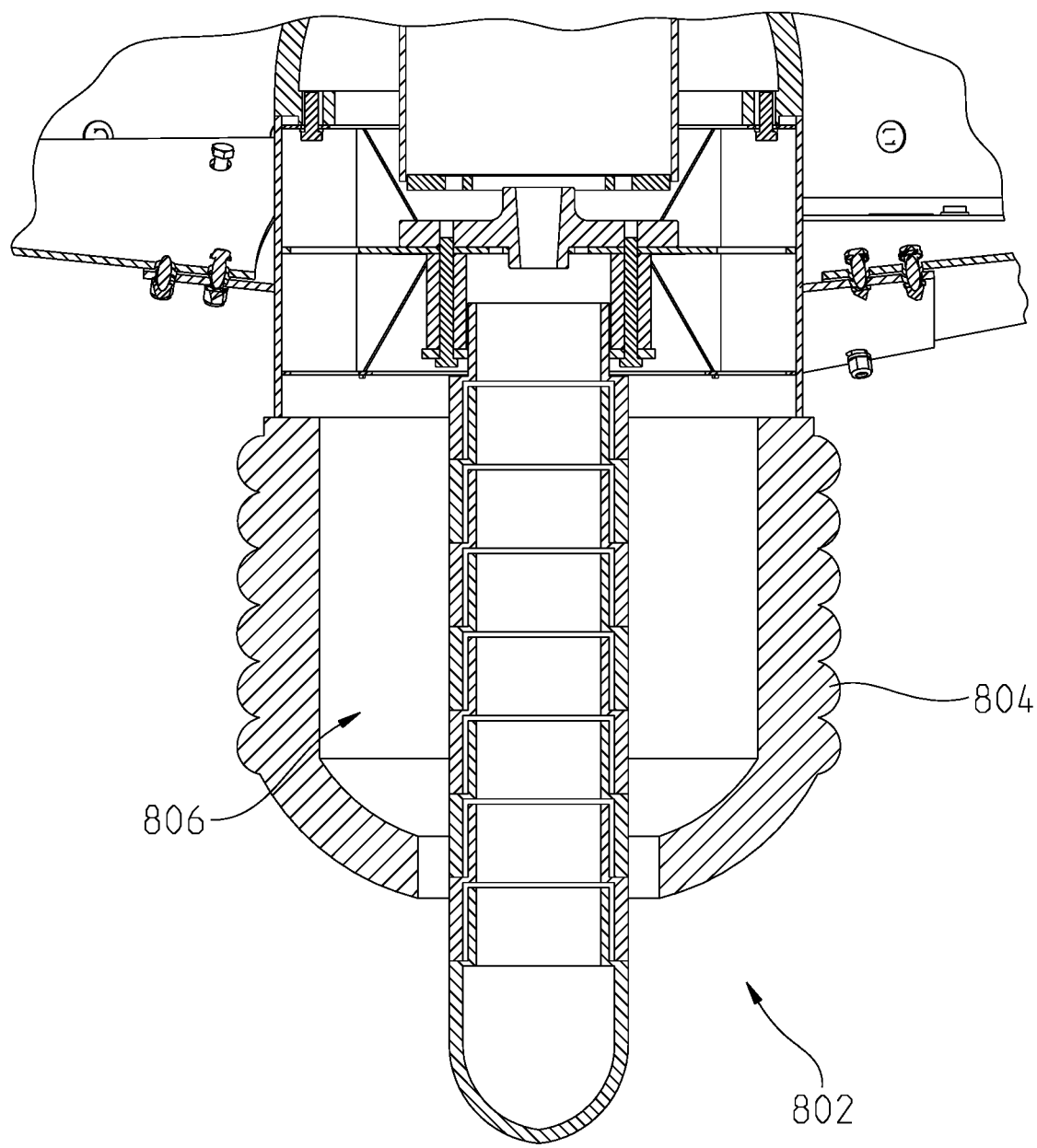
FIG. 8 is another embodiment of a hub cover assembly.

In FIG. 8, another embodiment of a nose hub 802 is illustrated. This embodiment may function substantially the same way as the adjustable hub cover 350 except the hub cover 804 may have an accordion-like configuration instead of nested segments 316. The accordion-like configuration may allow the length of the hub cover 804 to be altered as discussed herein for the adjustable hub cover 350 without requiring adjacent segments to slide over one another. Rather, the hub cover 804 may be formed of one integral material having folds or bends therein that allow the axial length of the hub cover 804 to be altered without harming the hub cover 804. This allows the hub cover 804 to protect an interior region 806 from debris while allowing the hub cover 804 to be resized as discussed herein.

In one aspect of this disclosure, a machine 100 may be configured to harvest a crop such as sugarcane. The machine 100 may have a harvesting head 142 configured to cut the crop and direct it into a cutter assembly 120. The cut crop may be directed to an extractor assembly 300 that has a fan 304 with an inlet side 210 and an outlet side 214, the fan 304 being selectively controlled by a motor 310. The extractor assembly 300 has an adjustable hub cover 350 that is repositionable. The volume of displacement along the inlet side of the fan 304 is adjustable using any of the methods discussed herein. For example, actuators 326, 328 may be selectively controlled by the controller 422 based on feedback from sensors of the machine, the user may selectively alter the size of the adjustable hub cover 350 through the user interface 422, or the user may manually alter the size of the adjustable hub cover 350. Regardless of the method, the size of the adjustable hub cover 350 may be altered to increase the efficiency for which debris is separated from billets 206 at the extractor 300.

This disclosure contemplated an adjustable hub cover having many different shapes and available sizes. For example, the hub cover may be segmented as illustrated herein or be formed of a bladder, cone, cube, disc, square, or any other known shape. Accordingly, any shape that provides for varying sizes that can be altered via electric, hydraulic, mechanical, or pneumatic actuators or mechanisms. In one embodiment, the hub cover may be bladder that is selectively filled with air from a compressor.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A fan hub cover assembly for an extractor for a harvesting machine, comprising:
    a fan assembly comprising a fan hub comprising blades cantilevered from a radially inner end to the fan hub and extending radially away from the fan hub;
    a hub cover positioned along a rotation axis of the fan assembly of the extractor, the fan assembly configured to selectively draw air and other debris from a harvested crop;
    wherein, the hub cover is positioned on an inlet side of the fan assembly along the rotation axis so the fan assembly draws air and other debris from the inlet side of the fan assembly along the rotation axis, past the hub cover, and to an exhaust side of the fan assembly along the rotation axis, the exhaust side being opposite of the inlet side relative to the hub cover along the rotation axis;
    wherein, the hub cover is adjustable to alter the profile of the hub cover relative to the rotation axis.

2. The fan hub cover assembly of claim 1, further wherein the hub cover comprises at least one nested segment that overlaps an adjacent segment of the hub cover to allow the hub cover to expand axially along the rotation axis while substantially shielding an interior region of the fan hub from debris.

3. The fan hub cover assembly of claim 2, further wherein the hub cover comprises more than one nested segment that at least partially overlaps an adjacent nested segment.

4. The fan hub cover assembly of claim 1, further comprising a core member positioned along the rotation axis and at least partially within the hub cover, the core member configured to extend axially away from the hub cover along the rotation axis relative to the fan assembly.

5. The fan hub cover assembly of claim 4, further wherein both the hub cover and the core member are selectively expandable along the rotation axis.

6. The fan hub cover assembly of claim 4, further wherein the core member comprises at least one nested segment that at least partially overlaps an adjacent segment.

7. The fan hub cover assembly of claim 1, further comprising an actuator that selectively alters the size of the hub cover.

8. The fan hub cover assembly of claim 7, further comprising a user interface wherein the actuator is selectively adjustable through the user-interface.

9. The fan hub cover assembly of claim 7, further comprising a controller that selectively alters the size of the hub cover with the actuator based on operating conditions.

10. The fan hub cover assembly of claim 9, further wherein the operating conditions are input by a user.

11. The fan hub cover assembly of claim 9, further comprising at least one vehicle sensor on the harvesting machine and in communication with the controller, wherein the operating conditions are readings from the at least one vehicle sensor configured to indicate a flow rate of crop through the harvesting machine.

12. The fan hub cover assembly of claim 7, further comprising a core member and the actuator selectively alters the size of the fan hub by altering the position of one or more of the fan hub and the core member.

13. The fan hub cover assembly of claim 12, further comprising a second actuator wherein one of the actuator or the second actuator selectively alters the size of the fan hub and the other of the actuator or second actuator selectively alters the size of the core member.

14. The fan hub cover assembly of claim 1, further wherein the hub cover comprises an accordion-like configuration that permits axial expansion of the hub cover while substantially sealing an interior region thereof.

15. The fan hub cover assembly of claim 1, further wherein the hub cover rotates with the fan assembly.

16. A harvesting machine, comprising:
- a ground engaging mechanism configured to selectively move the harvesting machine along an underlying surface;
- a prime mover configured to selectively power the ground engaging mechanism;
- a harvesting head configured to harvest a crop from the underlying surface;
- a processing assembly configured to separate debris from the crop;
- an extractor assembly in the processing assembly, the extractor assembly comprising:
  - a fan assembly comprising a fan hub comprising blades cantilevered from a radially inner end to the fan hub and extending radially away from the fan hub, the fan assembly configured to separate debris from the crop, the fan assembly having an inlet side and an exhaust side and selectively powered by a motor to rotate about a rotation axis; and
  - a hub cover positioned along the rotation axis and extending at least partially into the inlet side of the fan assembly;
- wherein, the hub cover is adjustable to alter a volume of displacement to agitate crop and debris presented to the inlet side of the fan assembly;
- wherein, the hub cover is positioned along the rotation axis so the fan assembly draws air and other debris from the inlet side of the hub cover along the rotation axis, past the hub cover, and to the exhaust side of the fan assembly along the rotation axis, the exhaust side being opposite of the inlet side relative to the fan assembly along the rotation axis.

17. The harvesting machine of claim 16, further wherein the hub cover comprises at least one nested segment that overlaps an adjacent segment to permit axial expansion of the hub cover along the rotation axis while substantially isolating an interior region of the hub cover from debris.

18. The harvesting machine of claim 16, further comprising a core member positioned along the rotation axis, wherein both the core member and the hub cover are axially extendable along the rotation axis.

19. The harvesting machine of claim 18, further wherein the core member is axially extendable along the rotation axis independently from the hub cover.

20. A method for improving crop capture in a harvesting machine, comprising:
- providing a harvesting head, a processing assembly with an extractor assembly, the extractor assembly comprising a fan assembly comprising a fan hub comprising blades cantilevered from a radially inner end to the fan hub and extending radially away from the fan hub, the fan assembly having an inlet side and being selectively powered by a motor to rotate about a rotation axis and a hub cover positioned along the rotation axis and extending at least partially into the inlet side of the fan assembly, the hub cover configured to be variably sized to accommodate different crop conditions;
- adjusting the hub cover to alter a volume of displacement along the inlet side to agitate crop and debris presented to the inlet side of the fan assembly;
- wherein, the adjusting the hub is configured to be performed one or more of manually, through user inputs on a user interface, or automatically by a controller responsive to inputs from sensors on the harvesting machine;
- wherein, the hub cover is positioned along the rotation axis so the fan assembly draws air and other debris from an inlet side of the fan assembly along the rotation axis, past the hub cover, and to an exhaust side of the fan assembly along the rotation axis, the exhaust side being opposite of the inlet side relative to the hub cover along the rotation axis.

* * * * *